(12) United States Patent
Kodemura

(10) Patent No.: US 6,310,160 B1
(45) Date of Patent: Oct. 30, 2001

(54) NORBORNENE POLYMER AND PROCESS FOR PREPARING THE SAME

(75) Inventor: Junji Kodemura, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/269,683

(22) PCT Filed: Sep. 29, 1997

(86) PCT No.: PCT/JP97/03465

§ 371 Date: Mar. 30, 1999

§ 102(e) Date: Mar. 30, 1999

(87) PCT Pub. No.: WO98/14499

PCT Pub. Date: Apr. 9, 1998

(30) Foreign Application Priority Data

Sep. 30, 1996 (JP) .................................................. 8-278925

(51) Int. Cl.⁷ .................................................. C08G 61/08
(52) U.S. Cl. .................... 526/281; 526/142; 526/283; 525/332.1; 525/338; 524/553; 524/554
(58) Field of Search .................................... 526/142, 281, 526/283; 525/332.1, 338; 524/553, 554

(56) References Cited

U.S. PATENT DOCUMENTS

| | | |
|---|---|---|
| 3,804,803 | 4/1974 | Streck et al. . |
| 3,959,234 | 5/1976 | Kurosawa et al. . |
| 3,974,092 | 8/1976 | Streck et al. . |
| 4,137,390 * | 1/1979 | Ofstead ............................. 526/142 X |
| 4,699,963 * | 10/1987 | Klosiewicz ....................... 526/283 X |
| 5,422,409 | 6/1995 | Brekner et al. . |
| 5,439,722 | 8/1995 | Breckner et al. . |
| 5,439,992 * | 8/1995 | Yi et al. ............................ 526/283 X |
| 5,462,995 | 10/1995 | Hosaka et al. . |
| 5,610,253 | 3/1997 | Hatke et al. . |
| 5,629,398 | 5/1997 | Okamoto et al. . |
| 5,648,443 | 7/1997 | Okamoto et al. . |
| 5,756,623 * | 5/1998 | Kreuder et al. .................. 526/283 X |
| 5,837,787 * | 11/1998 | Harrington ....................... 526/281 X |
| 5,866,662 * | 2/1999 | Hatke et al. ...................... 526/283 X |
| 5,905,129 | 5/1999 | Murakami et al. . |

FOREIGN PATENT DOCUMENTS

| | | |
|---|---|---|
| 49-77799 | 7/1974 | (JP) . |
| 50-71800 | 6/1975 | (JP) . |
| 50-75300 | 6/1975 | (JP) . |
| 50-93201 | 7/1975 | (JP) . |
| 56-38320 | 4/1981 | (JP) . |
| 58-43412 | 9/1983 | (JP) . |
| 59-46525 | 11/1984 | (JP) . |
| 1-81818 | 3/1989 | (JP) . |
| 1-197460 | 8/1989 | (JP) . |
| 2-133406 | 5/1990 | (JP) . |
| 2-227424 | 9/1990 | (JP) . |
| 2-276842 | 11/1990 | (JP) . |
| 2-305814 | 12/1990 | (JP) . |
| 3-72512 | 3/1991 | (JP) . |
| 3-74409 | 3/1991 | (JP) . |
| 4-45113 | 2/1992 | (JP) . |
| 4-170425 | 6/1992 | (JP) . |
| 4-363312 | 12/1992 | (JP) . |
| 5-9223 | 1/1993 | (JP) . |
| 5-105743 | 4/1993 | (JP) . |
| 5-93048 | 4/1993 | (JP) . |
| 5-112621 | 5/1993 | (JP) . |
| 5-132545 | 5/1993 | (JP) . |
| 5-132546 | 5/1993 | (JP) . |
| 5-132815 | 5/1993 | (JP) . |
| 5-170829 | 7/1993 | (JP) . |
| 5-230144 | 9/1993 | (JP) . |
| 6-1831 | 1/1994 | (JP) . |
| 6-73168 | 3/1994 | (JP) . |
| 6-211937 | 8/1994 | (JP) . |
| 8-72210 | 3/1995 | (JP) . |
| 7-102043 | 4/1995 | (JP) . |
| 7-179575 | 7/1995 | (JP) . |
| 7-188396 | 7/1995 | (JP) . |
| 7-206999 | 8/1995 | (JP) . |
| 7-224122 | 8/1995 | (JP) . |
| 8-100029 | 4/1996 | (JP) . |
| 8-295725 | 11/1996 | (JP) . |
| WO9533786 | 12/1995 | (WO) . |
| WO9610596 | 11/1996 | (WO) . |

OTHER PUBLICATIONS

Supplementary European Search Report for Appln No. EP 97 94 1268 dated Oct. 18, 1999.

* cited by examiner

Primary Examiner—Fred Teskin
(74) Attorney, Agent, or Firm—Dinsmore & Shohl LLP

(57) ABSTRACT

The invention relates to a norbornene polymer containing repeating units formed from a norbornene monomer in its main chain and having a weight average molecular weight (Mw) ranging from 10,000 to 1,000,000 and a ratio (Mw/Mn) of the weight average molecular weight (Mw) to the number average molecular weight (Mn) ranging from 1.60 to 1.95, and a production process thereof.

14 Claims, No Drawings

US 6,310,160 B1

NORBORNENE POLYMER AND PROCESS FOR PREPARING THE SAME

TECHNICAL FIELD

The present invention relates to a norbornene polymer excellent in strength properties and processability and hard to undergo discoloration, and a production process thereof. The present invention also relates to a molding material comprising such a norbornene polymer.

BACKGROUND ART

Thermoplastic norbornene polymers obtained by subjecting a norbornene monomer to ring-opening polymerization or addition polymerization in the presence of a metathesis catalyst system and optionally hydrogenating a polymer formed after the polymerization are excellent in various properties such as transparency, insulating properties, low dielectric properties, heat resistance, moisture resistance and mechanical strength. Therefore, investigations are being made as to the applications of such norbornene polymers to various uses such as optical materials, medical materials and semiconductor materials. Among these uses, for example, medical bottles, syringes, vials, housings, casings, insulating materials, etc. are particularly required to improve their strength properties and resistance to discoloration.

As processes for producing norbornene polymers, there have heretofore been proposed, for example, the following various processes:

(1) In Japanese Patent Publication No. 4528/1989, there is proposed a process in which dicyclopentadiene is subjected to ring-opening polymerization using a metathesis catalyst system composed of $WCl_6/Bu_4Sn$ (Group IVB)/$Et_2O$. According to this process, however, the molecular weight distribution (Mw/Mn) of the resulting polymer becomes wide, and so its processability is lowered if its molecular weight is made high for the purpose of improving its strength properties.

(2) In Japanese Patent Publication No. 43412/1983, there is proposed a process in which dicyclopentadiene is subjected to ring-opening polymerization using a metathesis catalyst system composed of $TiCl_6/Et_3Al/Et_3N$. According to this process, however, the molecular weight distribution of the resulting polymer cannot be sufficiently narrowed, and so it is difficult to balance the strength properties and processability of the polymer with each other at a high level. In addition, this process also involves a drawback that since the catalyst is used in a great amount, a great amount of a metallic catalyst residue is left in the polymer formed, and so the polymer undergoes discoloration.

(3) In Japanese Patent Application Laid-Open No. 197460/1989, there is proposed a process in which a norbornene monomer is subjected to ring-opening polymerization using a metathesis catalyst system composed of $WCl_6$/i-$Bu_3Al$/paraldehyde. According to this process, however, gelation tends to occur in the course of the reaction, and so it is difficult to produce a norbornene polymer having a high molecular weight and a sufficiently narrow molecular weight distribution.

(4) Japanese Patent Application Laid-Open Nos. 179575/1995, 188396/1995 and 206999/1995 each disclose a process for producing a norbornene polymer having a ratio (Mw/Mn) of the weight average molecular weight (Mw) to the number average molecular weight (Mn) of 1.36 or lower by a living metathesis polymerization method. However, this process involves a drawback that since a catalyst is used in a great amount due to living polymerization, a great amount of a metallic catalyst residue is left in the resulting norbornene polymer. In addition, the processability of such a polymer is insufficient.

DISCLOSURE OF THE INVENTION

It is an object of the present invention to provide a norbornene polymer excellent in strength properties and processability and hard to undergo discoloration, and a production process thereof.

Another object of the present invention is to provide a molding material which comprises a norbornene polymer excellent in strength properties and processability and can retain high strength properties over a long period of time.

The present inventors have carried out an extensive investigation with a view toward overcoming the above problems involved in the prior art. As a result, it has been found that when the following catalyst system (I) or (II) is used as a metathesis catalyst system in a process for producing a norbornene polymer by polymerizing a norbornene monomer in the presence of the metathesis catalyst system, a norbornene polymer, which has a high molecular weight and a narrow molecular weight distribution and is extremely low in the content of a metallic catalyst residue (residual metal content), is obtained.

Catalyst System (I):
A catalyst system containing:
(1) at least one transition metal compound selected from the group consisting of W compounds, Mo compounds and Re compounds;
(2) an organoaluminum compound; and
(3) an alcohol,
wherein the sum total of the number of carbon atoms in the organic residue of the organoaluminum compound and the number of carbon atoms in the alcohol is at least 9.

Catalyst System (II):
A catalyst system containing:
(1) at least one transition metal compound selected from the group consisting of W compounds, Mo compounds and Re compounds;
(2) an organoaluminum compound;
(3) an alcohol; and
(4) another oxygen-containing organic compound than the alcohol.

Norbornene polymers obtained by using these catalyst systems feature that they are excellent in strength properties owing to their high molecular weights and in processability owing to their narrow molecular weight distributions, and hard to undergo discoloration owing to their low residual metal contents. When a stabilizer is contained in the norbornene polymers, their high strength properties are retained over a long period of time. The present invention has been led to completion on the basis of these findings.

According to the present invention, there is thus provided a norbornene polymer containing repeating units formed from a norbornene monomer in its main chain and having a weight average molecular weight (Mw) ranging from 10,000 to 1,000,000 and a ratio (Mw/Mn) of the weight average molecular weight (Mw) to the number average molecular weight (Mn) ranging from 1.60 to 1.95.

According to the present invention, there is also provided a process for producing a norbornene polymer by polymerizing a norbornene monomer in the presence of a metathesis catalyst system, the process comprising using, as the metathesis catalyst system, a catalyst system containing (1) at least one transition metal compound selected from the group consisting of W compounds, Mo compounds and Re compounds, (2) an organoaluminum compound, and (3) an alcohol having at least 2 carbon atoms, wherein the sum total of the number of carbon atoms in the organic residue of the organoaluminum compound and the number of carbon atoms in the alcohol is at least 9.

According to the present invention, there is further provided a process for producing a norbornene polymer by polymerizing a norbornene monomer in the presence of a metathesis catalyst system, the process comprising using, as the metathesis catalyst system, a catalyst system containing (1) at least one transition metal compound selected from the group consisting of W compounds, Mo compounds and Re compounds, (2) an organoaluminum compound, (3) an alcohol, and (4) another oxygen-containing organic compound than the alcohol.

According to the present invention, there is still further provided a molding material comprising a norbornene polymer having a weight average molecular weight (Mw) ranging from 10,000 to 1,000,000 and a ratio (Mw/Mn) of the weight average molecular weight (Mw) to the number average molecular weight (Mn) ranging from 1.60 to 1.95, and a stabilizer.

BEST MODE FOR CARRYING OUT THE INVENTION

Norbornene Polymer:

The norbornene polymers according to the present invention include norbornene polymers containing, as repeating units of its main chain, repeating units represented by a formula (1):

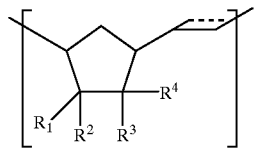

(1)

wherein $R^1$ to $R^4$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^1$ to $R^4$ may be bonded to each other to form an unsaturated bond, monocycle or polycycle, the monocycle or polycycle may have double bond(s) or be in the form of an aromatic ring, and $R^1$ and $R^2$, or $R^3$ and $R^4$ may form an alkylidene group, and ⋯ means either a carbon-carbon single bond or a carbon-carbon double bond.

The norbornene polymers according to the present invention also include norbornene polymers containing, as repeating units of its main chain, repeating units represented by a formula (2):

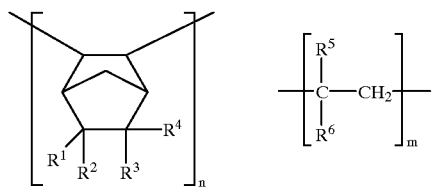

(2)

wherein $R^1$ to $R^4$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^1$ to $R^4$ may be bonded to each other to form an unsaturated bond, monocycle or polycycle, the monocycle or polycycle may have double bond(s) or be in the form of an aromatic ring, and $R^1$ and $R^2$, or $R^3$ and $R^4$ may form an alkylidene group, $R^5$ and $R^6$ are independently a hydrogen atom, or an alkyl or aryl group, and n and m satisfy the relationship of n+m=1, n=0.2 to 1, and m=0 to 0.8.

Preferable examples of the norbornene polymers having the repreating units represented by the formula (1) include (co)polymers obtained by the ring-opening polymerization of a norbornene monomer having a repeating unit represented by a formula (3):

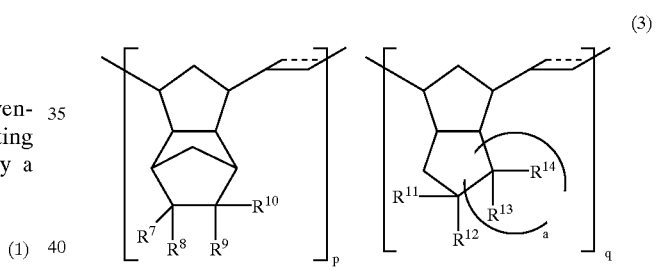

(3)

wherein $R^7$ to $R^{10}$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^7$ to $R^{10}$ may be bonded to each other to form an unsaturated bond, monocycle or polycycle, the monocycle or polycycle may have double bond(s) or be in the form of an aromatic ring, and $R^7$ and $R^8$, or $R^9$ and $R^{10}$ may form an alkylidene group, $R^{11}$ to $R^{14}$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^{11}$ to $R^{14}$ may be bonded to each other to form an unsaturated bond, monocycle or polycycle, the monocycle or polycycle may have double bond(s) or be in the form of an aromatic ring, and $R^{11}$ and $R^{12}$, or $R^{13}$ and $R^4$ may form an alkylidene group, a is 1 or 2, p and q satisfy the relationship of p+q=1, p=0 to 1, and q=0 to 1, and ⋯ means either a carbon-carbon single bond or a corbon-carbon double bond.

Preferably, $R^7$ to $R^{10}$ are independently a hydrogen atom, an alkyl group having 1 to 6 carbon atoms or an alkylidene group having 1 to 6 carbon atoms, or at least two of $R^7$ to $R^{10}$ are bonded to each other to form a cyclohexane ring, cyclopentane ring, norbornene ring or benzene ring.

Preferably, $R^{11}$ to $R^{14}$ are independently a hydrogen atom, an alkyl group having 1 to 6 carbon atoms or an alkylidene group having 1 to 6 carbon atoms, or at least two of $R^{11}$ to $R^{14}$ are bonded to each other to form a cyclohexane ring, cyclopentane ring, norbornene ring or benzene ring.

Preferable examples of the norbornene polymers having the repreating units represented by the formula (2) include (co)polymers obtained by the ring-opening polymerization of a norbornene monomer having a repeating unit represented by a formula (4):

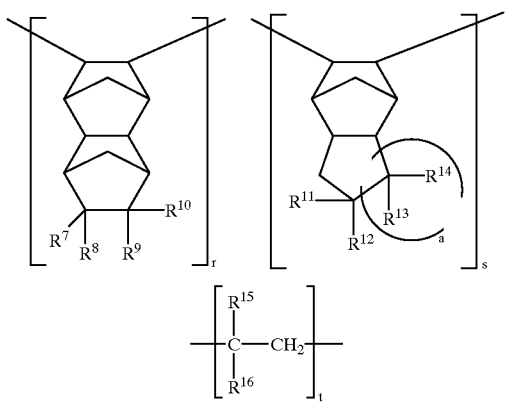

(4)

wherein $R^7$ to $R^{10}$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^7$ to $R^{10}$ may be bonded to each other to form an unsaturated bond, monocycle or polycycle, the monocycle or polycycle may have double bond(s) or be in the form of an aromatic ring, and $R^7$ and $R^8$, or $R^9$ and $R^{10}$ may form an alkylidene group, $R^{11}$ to $R^{14}$ are independently a hydrogen atom, hydrocarbon group, halogen atom, hydroxyl group, ester group, alkoxy group, cyano group, amide group, imide group or silyl group, or a hydrocarbon group substituted by a polar group (i.e., a halogen atom, hydroxyl group, ester group, alkoxy group, cyano group, amide group, imide group or silyl group), with the proviso that at least two of $R^{11}$ to $R^{14}$ may be bonded to each other to form an unsaturated bond, monocycle or polycycle, the monocycle or polycycle may have double bond(s) or be in the form of an aromatic ring, and $R^{11}$ and $R^{12}$, or $R^{13}$ and $R^{14}$ may form an alkylidene group, $R^{15}$ and $R^{16}$ are independently a hydrogen atom, or an alkyl or aryl group, a is 1 or 2, and r, s and t satisfy the relationship of r+s+t=1, r+s=0.2 to 1, t=0 to 0.8, r=0 to 1, and s=0 to 1.

Preferably, $R^7$ to $R^{10}$ are independently a hydrogen atom, an alkyl group having 1 to 6 carbon atoms or an alkylidene group having 1 to 6 carbon atoms, or at least two of $R^7$ to $R^{10}$ are bonded to each other to form a cyclohexane ring, cyclopentane ring, norbornene ring or benzene ring.

Preferably, $R^{11}$ to $R^{14}$ are independently a hydrogen atom, an alkyl group having 1 to 6 carbon atoms or an alkylidene group having 1 to 6 carbon atoms, or at least two of $R^{11}$ to $R^{14}$ are bonded to each other to form a cyclohexane ring, cyclopentane ring, norbornene ring or benzene ring.

r+s is preferably 0.2 to 1, more preferably 0.4 to 1, most preferably 0.7 to 1. t is preferably 0 to 0.6, more preferably 0 to 0.3. r is preferably 0.2 to 1. s is preferably 0.2 to 1.

Preferably, $R^{15}$ and $R^{16}$ are independently a hydrogen atom, an alkyl group having 1 to 6 carbon atoms or an aryl group having 6 to 10 carbon atoms, and more preferably a hydrogen atom.

The norbornene polymers according to the present invention feature that they have the repeating units represented by the formula (1) or (2), a high molecular weight and a narrow molecular weight distribution. Besides, the norbornene polymers according to the present invention scarcely contain a metallic catalyst residue.

The norbornene polymers according to the present invention have a weight average molecular weight (Mw) ranging from 10,000 to 1,000,000, preferably from 15,000 to 500,000, more preferably from 20,000 to 100,000, most preferably from 30,000 to 70,000 in terms of polyisoprene as measured by gel permeation chromatography (GPC) using cyclohexane as a solvent [or expressed by a weight average molecular weight (Mw) in terms of polystyrene using a toluene solvent if a polymer is insoluble in cyclohexane]. If the weight average molecular weight (Mw) of a norbornene polymer is too low, its strength properties become insufficient. If the Mw is too high on the other hand, its processability becomes insufficient. The polymer having such a too low or high molecular weight is hence not preferred.

The norbornene polymers according to the present invention have a ratio (Mw/Mn) of the weight average molecular weight (Mw) to the number average molecular weight (Mn) by the GPC measurement under the above conditions ranging from 1.60 to 1.95, preferably from 1.65 to 1.95, more preferably from 1.70 to 1.95. If the molecular weight distribution (Mw/Mn) of a norbornene polymer is too wide, its strength properties become insufficient, and so such a polymer is not preferred. If the molecular weight distribution (Mw/Mn) of a norbornene polymer is too narrow, there is a possibility that the processability of such a polymer may be deteriorated when the weight average molecular weight (Mw) of the norbornene polymer is high.

The residual metal content in each of the norbornene polymers according to the present invention is a value measured by means of an inductively coupled plasma emission spectrometer and is generally 10 ppm or lower, preferably 5 ppm or lower, more preferably 1 ppm or lower, most preferably 0.1 ppm or lower. Therefore, these polymers have excellent resistance to discoloration.

Production Process of Norbornene Polymer:

No particular limitation is imposed on the production process of the norbornene polymers according to the present invention. A norbornene monomer is polymerized in the presence of the specific metathesis catalyst system, whereby a norbornene polymer having a high molecular weight and a narrow molecular weight distribution can be suitably produced. The ring-opening (co)polymer having repeating units represented by the formula (1) can be obtained by using at least one norbornene monomer as a monomer. The addition (co)polymer having repeating units represented by the formula (2) can be obtained by polymerizing at least one norbornene monomer, if desired, together with a vinyl compound. The production processes according to the present invention are preferably applied to the production of ring-opening (co)polymers. After the polymerization, the carbon-carbon double bonds in the resultant ring-opening (co)polymers may be hydrogenated as needed.

More specifically, the production processes of norbornene polymers include a process for producing a norbornene monomer in the presence of a metathesis catalyst system, wherein the following catalyst system (I) or (II) is used as the metathesis catalyst system.

Catalyst System (I):

A catalyst system containing:

(1) at least one transition metal compound selected from the group consisting of W compounds, Mo compounds and Re compounds;

(2) an. organoaluminum compound; and (3) an alcohol, wherein the sum total of the number of carbon atoms in the organic residue of the organoaluminum compound and the number of carbon atoms in the alcohol is at least 9.

Catalyst System (II):

A catalyst system containing:

(1) at least one transition metal compound selected from the group consisting of W compounds, Mo compounds and Re compounds;

(2) an organoaluminum compound;

(3) an alcohol; and (4) another oxygen-containing organic compound than the alcohol.

Norbornene Monomer:

As the norbornene monomer, there may be used, for example, at least one of compounds represented by a formula (5):

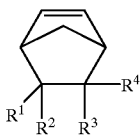

(5)

wherein $R^1$ to $R^4$ have the same meanings as defined in the formula (1).

As examples of preferable norbornene monomers, may be mentioned norbornene monomers represented by a formula (6):

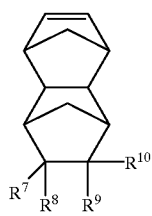

(6)

wherein $R^7$ to $R^{10}$ have the same meanings as defined in the formula (3), and a formula (7):

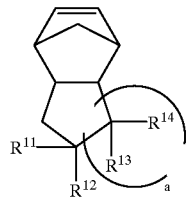

(7)

wherein $R^{11}$ to $R^{14}$ and a have the same meanings as defined in the formula (3).

Specific examples of the usable norbornene monomers include known monomers disclosed in, for example, Japanese Patent Application Laid-Open Nos. 227424/1990, 276842/1990 and 72210/1996. Specifically, there may be mentioned the following norbornene monomers:

Bicyclo[2.2.1]hept-2-ene derivatives, tetracyclo[$4.4.0.1^{2,5}.1^{7,10}$]-3-dodecene derivatives, hexacyclo[$6.6.1.1^{3,6}.1^{10,13}.0^{2,7}.0^{9,14}$]-4-heptadecene derivatives, octacyclo[$8.8.0.1^{2,9}.1^{4,7}.1^{11,18}.1^{13,16}.0^{3,8}.0^{12,17}$]-5docosene derivatives, pentacyclo[$6.6.1.1^{3,6}.0^{2,7}0^{9,14}$]-4-hexadecene derivatives, heptacyclo-5-eicosene derivatives, heptacyclo-5-heneicosene derivatives, tricyclo[$4.3.0.1^{2,5}$]- 3-decene derivatives, tricyclo[$4.4.0.1^{2,5}$]-3-undecene derivatives, pentacyclo[$6.5.1.1^{3,6}.0^{2,7}.0^{9,13}$]-4-pentadecene derivatives, pentacyclopentadecadiene derivatives, pentacyclo[$7.4.0.1^{2,5}.1^{9,12}.0^{8,13}$]-3-pentadecene derivatives, heptacyclo [$8.7.0.1^{3,6}.1^{10,17}.1^{12,15}.0^{2,7}.0^{11,16}$]-4-eicosene derivatives, nonacyclo[$10.9.1.1^{4,7}.1^{13,20}.1^{15,18}.0^{3,8}.0^{2,10}.0^{12,21}.0^{14,19}$]-5-pentacosene derivatives, pentacyclo[$8.4.0.1^{2,5}.1^{9,12}.0^{8,13}$]-3-hexadecene derivatives, heptacyclo[$8.8.0.1^{4,7}.1^{11,18}.1^{13,16}.0^{3,8}.0^{12,17}$]-5-heneicosene derivatives, nonacyclo [$10.10.1,1^{5,8}.1^{14,21}.1^{16,19}.0^{2,11}.0^{4,9}.0^{13,22}.0^{15,20}$]-5hexacosene derivatives, 1,4-methano-1,4,4a,9a-tetrahydrofluorene derivatives, 1,4-methano-1,4,4a,5,10, 10a-hexahydro-anthracene derivatives and cyclopentadiene-acenaphthylene adducts.

Specific examples of the norbornene monomers represented by the formula (6) include, for example, tetracyclo [$4.4.0.1^{2,5}.1^{7,10}$]-3-dodecene derivatives such as tetracyclo [$4.4.0.1^{2,5}.1^{7,10}$]-3-dodecene, 8-methyltetracyclo[$4.4.0.1^{2,5}.1^{7,10}$]-3-dodecene, 8-ethyltetracyclo[$4.4.0.1^{2,5}.1^{7,10}$]-3-dodecene, 8-propyltetracyclo[$4.4.0.1^{2,5}.1^{7,10}$]-3-dodecene, 8-butyl-tetracyclo[$4.4.0.1^{2,5}.1^{7,10}$]-3-dodecene, 8-isobutyltetracyclo[$4.4.0.1^{2,5}.1^{7,10}$]-3-dodecene, 8-hexyltetracyclo[$4.4.0.1^{2,5}.1^{7,10}$]-3-dodecene, 8-cyclohexyltetracyclo[$4.4.0.1^{2,5}.1^{7,10}$]-3-dodecene, 8-stearyltetracyclo[$4.4.0.1^{2,5}.1^{7,10}$]-3-dodecene, 5,10-dimethyltetracyclo[$4.4.0.1^{2,5}.1^{7,10}$]-3-dodecene, 2,10-dimethyltetracyclo[$4.4.0.1^{2,5}.1^{7,10}$]-3-dodecene, 8,9-dimethyltetracyclo[$4.4.0.1^{2,5}.1^{7,10}$]-3-dodecene, 8-ethyl-9-methyltetracyclo[$4.4.0.1^{2,5}.1^{7,10}$]-3-dodecene, 11,12-dimethyltetracyclo[$4.4.0.1^{2,5}.1^{7,10}$]-3-dodecene, 2,7,9-trimethyltetracyclo[$4.4.0.1^{2,5}.1^{7,10}$]-3-dodecene, 9-ethyl-2,7-dimethyltetracyclo[$4.4.0.1^{2,5}.1^{7,10}$]-3-dodecene, 9-isobutyl-2,7-dimethyltetracyclo[$4.4.0.1^{2,5}.1^{7,10}$]-3-dodecene, 9,11,12-trimethyltetracyclo[$4.4.0.1^{2,5}.1^{7,10}$]-3-dodecene, 9-ethyl-11,12-dimethyltetracyclo[$4.4.0.1^{2,5}.1^{7,10}$]-3-dodecene, 9-isobutyl-11,12-dimethyltetracyclo [$4.4.0.1^{2,5}.1^{7,10}$]-3-dodecene, 5,8,9,10-tetramethyltetracyclo [$4.4.0.1^{2,5}.1^{7,10}$]-3-dodecene, 8-ethylidene-9-methyltetracyclo[$4.4.0.1^{2,5}.1^{7,10}$]-3-dodecene, 8-ethylidene-9-ethyl tetracyclo[$4.4.0.1^{2,5}.1^{7,10}$]-3-dodecene, 8-ethylidene-9-isopropyl tetracyclo[$4.4.0.1^{2,5}.1^{7,10}$]-3-dodecene, 8-ethylidene-9-butyltetracyclo[$4.4.0.1^{2,5}.1^{7,10}$]-

3-dodecene, 8-n-propylidenetetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropyliene-9-methyl tetracyclo[4.4.0.1$^{2,5}$.1$^{7,10}$]-3-dodecene, 8-isopropylidene-9-ethyltetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-isopropylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-fluorotetracycl[4.4.0.1$^{2,5}$.1$^{7,10}$]-3-dodecene and 8,9-dichloro tetracyclo[4.4.0.1$^{2,5}$.1$^{7,10}$]-3-dodecene; hexacyclo[6.6.1.1$^{3,6}$.1$^{10,13}$.0$^{2,7}$.0$^{9,14}$]-4-heptadecene derivatives such as hexacyclo[6.6.1.1$^{3,6}$.1$^{10,13}$.0$^{2,7}$.0$^{9,14}$]-4-heptadecene, 12-methylhexacyclo[6.6.1.1$^{3,6}$.1$^{10,13}$.0$^{2,7}$.0$^{9,14}$]-4-heptadecene, 12-ethylhexacyclo[6.6.1.1$^{3,6}$.1$^{10,13}$.0$^{2,7}$.0$^{9,14}$]-4-heptadecene, 12-isobutylhexacyclo[6.6.1.1$^{3,6}$.1$^{10,13}$.0$^{2,7}$.0$^{9,14}$]-4-heptadecene and 1,6,10-trimethyl-12-isobutylhexacyclo[6.6.1.1$^{3,6}$.1$^{10,13}$.0$^{2,7}$.0$^{9,14}$]-4-heptadecene; octacyclo[8.8.0.1$^{2,9}$.1$^{4,7}$.1$^{13,16}$.0$^{3,8}$.0$^{12,17}$]-5-docosene derivatives such as octacyclo[8.8 0.1$^{2,9}$.1$^{4,7}$.1$^{11,18}$.1$^{13,16}$.0$^{3,8}$.0$^{12,17}$]-5-docosene, 15-methyloctacyclo[8.8.0.1$^{2,9}$.1$^{4,7}$.1$^{11,18}$.1$^{13,16}$.0$^{3,8}$.0$^{12,17}$]-5-docosene and 15-ethyloctacyclo[8.8.0.1$^{2,9}$.1$^{2,9}$.1$^{4,7}$.1$^{11,18}$.1$^{13,16}$.0$^{3,8}$.0$^{12,17}$]-5-docosene; pentacyclo[6.6.1.1$^{3,6}$.0$^{2,7}$0$^{9,14}$]-4-hexadecene derivatives such as pentacyclo[6.6.1.1$^{3,6}$.0$^{2,7}$0$^{9,14}$]-4-hexadecene, 1.3-dimethylpentacyclo[6.6.1.1$^{3,6}$.0$^{2,7}$0$^{9,14}$]-4-hexadecene, 1,6-dimethylpentacyclo[6.6.1.1$^{3,6}$.0$^{2,7}$0$^{9,14}$]-4-hexadecene and 15,16-dimethylpentacyclo[6.6.1.1$^{3,6}$.0$^{2,7}$0$^{9,14}$]-4-hexadecene; heptacyclo-5-eicosene derivatives or heptacyclo-5-heneicosene derivatives such as heptacyclo[8.7.0.1$^{2,9}$.1$^{4,7}$.1$^{11,17}$.0$^{3,8}$.0$^{12,16}$]-5-eicosene and heptacyclo[8.8.0.1$^{2,9}$.1$^{4,7}$.1$^{11,17}$.0$^{3,8}$.0$^{12,16}$]-5-heneicosene; pentacyclo[6.5.1.1$^{3,6}$.0$^{2,7}$.0$^{9,13}$]-4-pentadecene derivatives such as pentacyclo[6.5.1.1$^{3,6}$.0$^{2,7}$.0$^{9,13}$]-4-pentadecene, 1,3-dimethylpentacyclo[6.5.1.1$^{3,6}$.0$^{2,7}$.0$^{9,13}$]-4-pentadecene, 1,6-dimethylpentacyclo[6.5.1.1$^{3,6}$.0$^{2,7}$.0$^{9}$-13]-4-pentadecene and 14,15-dimethylpentacyclo[6.5.1.1$^{3,6}$.0$^{2,7}$.0$^{9,13}$]-4 pentadecene; diene compounds such as pentacyclo[6.5.1.1$^{3,6}$.0$^{2,7}$.0$^{9,13}$]-4,10-pentadecadiene; and 8-phenyltetracyclo[4.4.0.1$^{2,5}$.1$^{7,10}$]-3-dodecene, 8-methyl-8-phenyltetracyclo[4.4.0.1$^{2,5}$.1$^{7,10}$]-3-dodecene, 8-benzyltetracyclo[4.4.0.1$^{2,5}$.1$^{7,10}$]-3-dodecene, 8-tolyltetracyclo[4.4.0.1$^{2,5}$.1$^{7,10}$]-3-dodecene, 8-(ethylphenyl)-tetracyclo[4.4.0.1$^{2,5}$.1$^{7,10}$]-3-dodecene, 8-(isopropylphenyl)-tetracyclo[4.4.0.1$^{2,5}$.1$^{7,10}$]-3-dodecene, 8,9-diphenyl-tetracyclo[4.4.0.1$^{2,5}$.1$^{7,10}$]-3-dodecene, 8-(biphenyl)-tetracyclo[4.4.0.1$^{2,5}$.1$^{7,10}$]-3-dodecene, 8-(β-naphthyl)-tetracyclo[4.4.0.1$^{2,5}$.1$^{7,10}$]-3-dodecene, 8-(α-naphthyl)-tetracyclo[4.4.0.1$^{2,5}$.1$^{7,10}$]-3-dodecene, 8-(anthracenyl)-tetracyclo[4.4.0.1$^{2,5}$.1$^{7,10}$]-3-dodecene, 11-phenylhexacyclo[6.6.1.1$^{3,6}$.0$^{2,7}$0$^{9,14}$]-4-heptadecene, 6-(α-naphthyl)-bicyclo[2.2.1]-hept-2-ene, 11,12-benzo-pentacyclo[6.5.1.1$^{3,6}$.0$^{2,7}$.0$^{9,13}$]-4-pentadecene, 11,12-benzo-pentacyclo[6.6.1.1$^{3,6}$.0$^{2,7}$0$^{9,14}$]-4-hexadecene and 14,15-benzo-heptacyclo[8.7.0.1$^{2,9}$.1$^{4,7}$.1$^{11,17}$.0$^{3,8}$.0$^{12,16}$]-5-eicosene.

Sepcific examples of the norbornene monomers represented by the formula (7) include, for example, tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene; pentacyclo[7.4.0.1$^{2,5}$.1$^{9,12}$.0$^{8,13}$]-3-pentadecene derivatives such as pentacyclo[7.4.0.1$^{2,5}$.1$^{9,12}$.0$^{8,13}$]-3-pentadecene and methyl-substituted pentacyclo[7.4.0.1$^{2,5}$.1$^{9,12}$.0$^{8,13}$]-3-pentadecene; heptacyclo[8.7.0.1$^{3,6}$.1$^{10,17}$.1$^{12,15}$.0$^{2,7}$.0$^{11,16}$]-4-eicosene derivatives such as heptacyclo[8.7.0.1$^{3,6}$.1$^{10,17}$.1$^{12,15}$.0$^{2,7}$.0$^{11,16}$]-4-eicosene and dimethyl-substituted heptacyclo[8.7.0.1$^{3,6}$.1$^{10,17}$.1$^{12,15}$.0$^{2,7}$.0$^{11,16}$]-4-eicosene; nonacyclo[10.9.1.1$^{4,7}$.1$^{13,20}$.1$^{15,18}$.0$^{3,8}$.0$^{2,10}$.0$^{12,21}$.0$^{14,19}$]-5 pentacosene derivatives such as nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and trimethyl-substituted nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene; monomers of polycyclic structures, which are oligomers of cyclopentadiene, such as tricyclo[4.3.0.1$^{2,5}$]-3,7-decadiene (i.e., dicyclopentadiene) and 2,3-dihydrodicyclopentadiene, and derivatives thereof; tricyclo[4.4.0.1$^{2,5}$]-3-undecene derivatives such as tricyclo[4.4.0.1$^{2,5}$]-3-undecene and 10-methyltricyclo[4.4.0.1$^{2,5}$]-3-undecene; 1,4-methano-1,4,4a,5,10,10a-hexahydroanthracene derivatives such as 1,4-methano-1,4,4a,5,10,10a-hexahydroanthracene; and 1,4-methano-1,4,4a,9a-tetrahydrofluorene derivatives such as 1,4-methano-1,4,4a,9a-tetrahydrofluorene, 1,4-methano-8-methyl-1,4,4a,9a-tetrahydrofluorene, 1,4-methano-8-chloro-1,4,4a,9a-tetrahydrofluorene and 1,4-methano-8-bromo-1,4,4a,9a-tetrahydrofluorene.

Sepecific examples of other norbornene monomers represented by the formula (5) include, for example, bicyclo[2.2.1]hept-2-ene derivatives such as bicyclo[2.2.1]hept-2-ene, 6-methylbicyclo[2.2.1]hept-2-ene, 5,6-dimethylbicyclo[2.2.1]hept-2-ene, 1-methylbicyclo[2.2.1]hept-2-ene, 6-ethylbicyclo[2.2.1]hept-2-ene, 6-n-butylbicyclo[2.2.1]hept-2-ene, 6-isobutylbicyclo[2.2.1]hept-2-ene and 7-methylbicyclo[2.2.1]hept-2-ene; pentacyclo[8.4.0.1$^{2,5}$.1$^{9,12}$.0$^{8,13}$]-3-hexadecene derivatives such as pentacyclo[8.4.0.1$^{2,5}$.1$^{9,12}$.0$^{8,13}$]-3-hexadecene, 11-methylpentacyclo[8.4.0.1$^{2,5}$.1$^{9,12}$.0$^{8,13}$]-3-hexadecene, 11-ethylpentacyclo[8.4.0.1$^{2,5}$.1$^{9,12}$.0$^{8,13}$]-3-hexadecene and 10,11-dimethylpentacyclo[8.4.0.1$^{2,5}$.1$^{9,12}$.0$^{8,13}$]-5-hexadecene; heptacyclo[8.8.0.1$^{4,7}$.1$^{11,18}$.1$^{13,16}$.0$^{3,8}$.0$^{12,17}$]-5-heneicosene derivatives such as heptacyclo[8.8.0.1$_{4,7}$.1$^{11,18}$.1$^{13,16}$.0$^{3,8}$.0$^{12,17}$]-5-heneicosene, 15-methylheptacyclo[8.8.0.1$^{4,7}$.1$^{11,18}$.1$^{13,16}$.0$^{3,8}$.0$^{12,17}$]-5-heneicosene and trimethylheptacyclo[8.8.0.1$^{4,7}$.1$^{11,18}$.1$^{13,16}$.0$^{3,8}$.0$^{12,17}$]-5-heneicosene; nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene; pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, methyl-substituted pentacyclo[6.5.1.1$^{3,6}$.0$^{2,7}$.0$^{9,13}$]-4,11-pentadecadiene, trimethyl-substituted pentacyclo[4.7.0.1$^{2,5}$.0$^{8,13}$.1$^{9,12}$]-3-pentadecene, pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, methyl-substituted pentacyclo[4.7.0.1$^{2,5}$.0$^{8,13}$.1$^{9,12}$]-3,10-pentadecadiene, methyl-substituted heptacyclo[7.8.0.1$^{3,6}$.0$^{2,7}$.1$^{10,17}$.0$^{11,16}$.1$^{12,15}$]- 4-eicosene, trimethyl-substituted heptacyclo[7.8.0.1$^{3,6}$.0$^{2,7}$.1$^{10,17}$.0$^{11,16}$.1$^{12,15}$]-4-eicosene, tetramethyl-substituted heptacyclo[7.8.0.1$^{3,6}$.0$^{2,7}$.1$^{10,17}$.0$^{11,16}$.1$^{12,15}$]-4-eicosene, 5-phenyl-bicyclo[2.2.1]hept-2-ene (i.e., 5-phenyl-2-norbornene), 5-methyl-5-phenyl-bicyclo[2.2.1]-hept-2-ene, 5-benzyl-bicyclo[2.2.1]hept-2-ene, 5-tolyl-bicyclo[2.2.1]hept-2-ene, 5-(ethylphenyl)-bicyclo[2.2.1]-hept-2-ene, 5-(isopropylphenyl)-bicyclo[2.2.1]hept-2-ene, 5-(anthracenyl)-bicyclo[2.2.1]hept-2-ene, 5-(biphenyl)-bicyclo[2.2.1]hept-2-ene, 5-(β-naphthyl)-bicyclo-[2.2.1]hept-2-ene, 5,6-diphenyl-bicyclo-[2.2.1]

hept-2-ene, 9-(2-norbornene-5-yl)-carbazole, 1,4-methano-1,4,4a,4b,5,8,8a,9a-octahydrofluorene and derivatives thereof; 1,4-methano-1,4,4a,9a-tetrahydro-benzofuran and derivatives thereof; 1,4-methano-1,4,4a,9a-tetrahydrocarbazole derivatives such as 1,4-methano-1,4,4a, 9a-tetrahydrocarbazole and 1,4-methano-9-phenyl-1,4,4a, 9a-tetrahydrocarbazole; 7,10-methano-6b,7,10,10a-tetrahydrofluoracene and derivatives thereof; and compounds obtained by further adding cyclopentadiene to the cyclopentadiene-acenaphthylene adducts.

These norbornene monomers may be used either singly or in any combination thereof. The proportion thereof may be suitably selected as necessary for the end application intended. However, it is generally at least 20 wt. %, preferably 40 to 100 wt. %, more preferably 70 to 100 wt. % in terms of bound unit of the norbornene monomer in the resulting norbornene polymer. If the proportion of the norbornene monomer is too low, the mechanical strength of the resulting norbornene polymer becomes insufficient, and various properties thereof are lost. It is hence not preferable to use the norbornene monomer in such a too low proportion.

Vinyl Compound:

Examples of the vinyl compound include ethylenes or α-olefins having 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; non-conjugated dienes such as 1,4-hexadiene, 4-methyl-1,4-hexadiene, 5-methyl-1,4-hexadiene and 1,7-octadiene; and aromatic vinyl compounds such as styrene, α-methylstyrene, o-methylstyrene, p-methylstyrene, 1,3-dimethylstyrene and vinylnaphthalene. Of these, ethylene is generally used. These vinyl compounds may be used either singly or in any combination thereof.

The proportion of the vinyl compound to be used is suitably selected within limits not impeding the effects of the present invention and is generally adjusted in such a manner that it falls within a range of the remainder of the above norbornene monomer bound unit in the norbornene polymer.

In the present invention, cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene may be suitably used as comonomers.

Metathesis Catalyst System

Examples of said at least one transition metal compound selected from the group consisting of W compounds, Mo compounds and Re compounds include $WCl_6$, $WCl_5$, $WCl_4$, $WCl_2$, $WBr_6$, $WBr_4$, $WBr_2$, $WF_6$, $WF4$, $WI6$, $WI_4$, $WOCl_4$, $WOBr_4$, $WOF_4$, $W(OC_6H_5)_6$, $WCl_2(OC_6H_5)_4$, $W(CO)_3 \cdot (CH_3CN)_3$, $W(OC_2H_5)_2Cl_3$, $(CO)_5W(OCH_3)(CH_3)$, $(CO)_5WC(OC_2H_5)(CH_3)$, $(CO)_5WC(OC_2H_5)(C_4H_5)$; $MoCl_5$, $MoCl_4$, $MoCl_3$, $MoBr_4$, $MoBr_3$, $MoBr_2$, $MoF_4$, $MoOCl_3$, $MoOF_3$, $Mo(OC_2H_5)_2Cl_3$, $Mo(OC_2H_5)_5$, $MoO_2(acac)_2$, $Mo(CO)_6$, $(CO)_5MoC(OC_2H_5)(CH_3)$; $ReCl_3$, $ReOCl_3$, $ReOBr_3$, $Re_2(CO)_{16}$, $ReOBr_3 \cdot P(C_6H_5)_3$; and the like.

Of these transition metal compounds, $MoCl_5$, $Mo(OC_2H_5)_2Cl_3$, $WCl_6$ and $W(OC_2H_5)_2Cl_3$ are particularly preferred.

These transition metal compounds may be used either singly or in any combination thereof. The amount of the transition metal compound to be used is generally within a range of from 0.001 to 10 mol, preferably from 0.005 to 5 mol, more preferably from 0.01 to 2 mol, per 100 mol of the whole monomer.

In the first production process of the present invention, the catalyst system is used by such a combination as the number of carbon atoms in the organic residue of the alcohol used is at least 2, and the sum total of the number of carbon atoms in the organic residue of the organoaluminum compound and the number of carbon atoms in the organic residue of the alcohol amounts to at least 9, preferably 10 to 30, more preferably 12 to 20.

The organoaluminum compound is represented by, for example, the formula, $R^{17}R^{18}R^{19}Al$ in which $R^{17}$, $R^{18}$ and $R^{19}$ mean organic residues. Examples of these organic residues include hydrocarbon groups such as alkyl groups, alkenyl groups, alkynyl groups and aryl groups, with the alkyl groups being preferred. No particular limitation is imposed on the number of carbon atoms in $R^{17}$ to $R^{19}$. However, it is generally at least 2, preferably, within a range of from 3 to 20, more preferably from 4 to 10. Specific examples of the organic residues include alkyl groups such as ethyl, propyl, isopropyl, butyl, isobutyl, sec-butyl, pentyl, hexyl, heptyl, octyl, nonyl, decanyl, undecanyl, dodecanyl, tridecanyl, tetradecanyl, pentadecanyl, octadecanyl, eicosyl, cyclopentyl and cyclohexyl; alkenyl groups such as propenyl and pentenyl; alkynyl groups such as propargyl; and aryl groups such as phenyl, benzyl and naphthyl. Of these, propyl, butyl, isobutyl, sec-butyl, pentyl, hexyl, heptyl, octyl, nonyl and decanyl are preferred, with butyl, isobutyl, sec-butyl, pentyl and hexyl being particularly preferred.

Specific examples of the organoaluminum compound inlcude triethylaluminum, tri-n-propylaluminum, triisopropylaluminum, tri-n-butylaluminum, triisobutylaluminum, trihexylaluminum, trioctylaluminum, tridecylaluminum, triphenylaluminum and tribenzylaluminum.

These organoaluminum compounds may be used either singly or in any combination thereof. The amount of the organoaluminum compound to be used is suitably selected according to the reaction conditions. However, it is generally within a range of from 1:1 to 1:1,000, preferably from 1:2 to 1:100, more preferably from 1:2 to 1:50 in terms of a matal atom ratio of the transition metal compound to the organoaluminum compound.

The alcohol is represented by, for example, the formula, $R^{20}OH$ in which $R^{20}$ means an organic residue having at least 2 carbon atoms. The number of carbon atoms in $R^{20}$ is generally within a range of from 2 to 20, preferably from 2 to 15, more preferably from 3 to 10. Examples of the organic residue of $R^{20}$ include alkyl groups, alkenyl groups, alkynyl groups and aryl groups. The alkyl groups and aryl groups are preferred, with the alkyl groups being more preferred. Specific examples of the organic residues include alkyl groups such as ethyl, propyl, butyl, isobutyl, sec-butyl, pentyl, neopentyl, hexyl, heptyl, octyl, nonyl, decanyl, undecanyl, dodecanyl, tridecanyl, tetradecanyl, pentadecanyl, octadecanyl, eicosyl, cyclopentyl and cyclohexyl; alkenyl groups such as propenyl and pentenyl; alkynyl groups such as propargyl; and aryl groups such as phenyl, benzyl and naphthyl. Of these, ethyl, propyl, butyl, isobutyl, sec-butyl, pentyl, hexyl, heptyl, octyl, nonyl, decanyl, penyl and benzyl are preferred, with propyl, butyl, isobutyl, sec-butyl, pentyl, hexyl and phenyl being particularly preferred.

Specific examples of the alcohol inlcude ethanol, propanol, isopropanol, butanol, isobutanol, sec-butanol, pentanol, hexanol, octanol, decanol, cyclopentanol, cyclohexanol, phenol and benzyl alcohol. Propanol, isopropanol, butanol, isobutanol, pentanol and phenol are preferred.

These alcohols may be used either singly or in any combination thereof. The amount of the alcohol to be used is suitably selected according to the reaction conditions. However, it is generally within a range of from 1:1 to 1:1,000, preferably from 1:2 to 1:100, more preferably from 1:2 to 1:50 in terms of a molar ratio of the transition metal compound to the alcohol.

Production Process:

The feature of the first production process of the present invention resides in that the catalyst system (I), i.e., a catalyst system containing in combination (1) the transition metal compound, (2) the organoaluminum compound and (3) the alcohol, wherein the sum total of the number of carbon atoms in the organic residue of the organoaluminum compound and the number of carbon atoms in the organic residue of the alcohol is at least 9, is used as a metathesis catalyst system.

The sum total of the number of carbon atoms in the organic residue of the organoaluminum compound and the number of carbon atoms in the organic residue of the alcohol is preferably 10 to 30, more preferably 12 to 20. More specifically, the combination of the organoaluminum compound and the alcohol is selected in such a manner that in the formulae $R^{17}R^{18}R^{19}Al$ and $R^{20}OH$, the sum total of the number of carbon atoms in the organic residues $R^{17}$, $R^{18}$ and $R^{19}$ and the number of carbon atoms in the organic residue $R^{20}$ amounts to at least 9, preferably 10 to 30, more preferably 12 to 20. If the total number of carbon atoms is too few, gelation takes place in the course of the polymerization reaction, resulting in a failure to obtain the intended norbornene polymer. It is hence not preferable to use such a catalyst system.

The second production process of the present invention features that the catalyst system (II), i.e., a catalyst system in which in addition to (1) at least one transition metal compound selected from the group consisting of the W compounds, Mo compounds and Re compounds, (2) the organoaluminum compound and (3) the alcohol, (4) another oxygen-containing organic compound than the alcohol is combined therewith, is used as the metathesis catalyst system. If the metathesis catalyst system is composed of only the combination of (1) the transition metal compound, (2) the organoaluminum compound and (3) the alcohol, gelation may take place in the course of the polymerization reaction in some cases. When (4) another oxygen-containing organic compound than the alcohol is further used in combination in such a case, the gelation can be prevented to obtain the intended norbornene polymer.

Examples of another oxygen-containing organic compound than the alcohol include ethers, ketones, esters and carboxylic acids. Of these, the ethers and esters are preferred.

Examples of the ethers include chain ethers such as dimethyl ether, methyl ethyl ether, diethyl ether, dipropyl ether, diisopropyl ether, dibutyl ether, diamyl ether, dihexyl ether and anisole; and cyclic ethers such as tetrahydrofuran, dioxane and paraformaldehyde.

Examples of the esters include methyl acetate, ethyl acetate, propyl acetate, isopropyl acetate, butyl acetate and isobutyl acetate.

These oxygen-containing organic compounds other than the alcohol may be used either singly or in any combination thereof. The amount of this component to be used is suitably selected according to the reaction conditions. However, it is generally within a range of from 1,000:1 to 1:1,000, preferably from 100:1 to 1:100, more preferably from 10:1 to 1:10 in terms of a molar ratio of the transition metal compound to the oxygen-containing organic compound.

No particular limitation is imposed on the preparation process of these polymerization catalysts. In the first production process, however, the organoaluminum compound is generally mixed with the alcohol, and at least a part (1 to 30 wt. %, preferably 5 to 15 wt. % of the whole monomer) of the norbornene monomer is then mixed. Thereafter, at least a part (generally 10 to 60 wt. %, preferably 20 to 50 wt. % of the whole amount) of the transition metal compound is added to initiate polymerization, and a mixture of the remaining norbornene monomer and transition metal compound is then added to continue the polymerization.

In the second production process, the organoaluminum compound, the alcohol, a part of the norbornene monomer and a part of the transition metal compound are mixed with one another in that order to prepare a catalyst system, and the remaining norbornene monomer and transition metal compound are propped to conduct polymerization.

The polymerization may be conducted without using any solvent. However, the polymerization is preferably carried out in an inert organic solvent. Examples of the solvent include aromatic hydrocarbons such as benzene, toluene and xylene; aliphatic hydrocarbons such as n-pentane, hexane and heptane; alicyclic hydrocarbons such as cyclohexane; and halogenated hydrocarbons such as styrene dichloride, dichloroethane, dichloroethylene, tetrachloroethane, chlorobenzene, dichlorobenzene and trichlorobenzene.

The polymerization is conducted at a temperature of generally −50° C. to 100° C., preferably −30° C. to 80° C., more preferably −20° C. to 60° C. under pressure of generally 0 to 50 kg/cm², preferably 0 to 20 kg/cm².

The ring-opening polymer of a norbornene monomer represented by the formula (5) is a polymer containing repeating units represented by a formula (8):

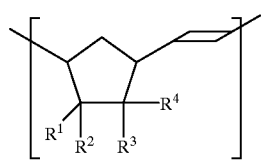

(8)

wherein the respective characters have the same meanings as defined in the formula (1).

The ring-opening (co)polymers of norbornene monomers represented by the formulae (6) and (7) are polymers containing repeating units represented by a formula (9):

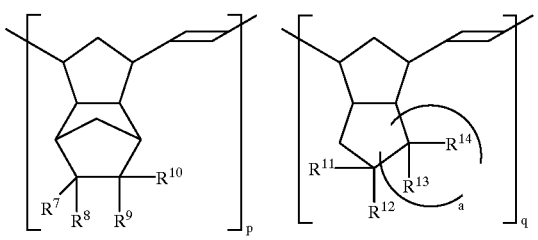

(9)

wherein the respective characters have the same meanings as defined in the formula (3).

The ring-opening (co)polymer of a norbornene monomer has carbon-carbon double bonds (C=C) in its main chain. When this ring-opening polymer is hydrogenated, the double bonds in the main chain are converted into carbon-carbon single bonds (C—C) by the hydrogenation. In this case, when the rate of hydrogenation does not reach 100%, carbon-carbon single bonds and double bonds come to coexist. In the formulae (1) and (3), ⋯ means all of unhydrogenated, hydrogenated and partially hydrogenated polymers.

The carbon-carbon double bonds in the main chain may be hydrogenated at a rate of hydrogenation of 95% or higher. When unconjugated carbon-carbon double bonds are present in side chains, such double bonds are hydrogenated at the same time as the hydrogenation of the double bonds in the main chain. When aromatic rings are present in side chains, the carbon-carbon double bonds in the main chain may be selectively hydrogenated to leave the aromatic rings as they are without being hydrogenated. However, the hydrogenation of the carbon-carbon double bonds in the main chain and conjugated double bonds in the aromatic rings may be conducted at the same time to saturate the aromatic rings by the hydrogenation.

Hydrogenation:

The norbornene polymers according to the present invention may be unhydrogenated polymers containing the repeating units represented by the formula (8), preferably, the formula (9) and having carbon-carbon double bonds in their main chains. However, they are preferably polymers at least the carbon-carbon double bonds in the main chain of which have been hydrogenated, from the viewpoints of heat resistance, weather resistance and the like. A hydrogenated (co)polymer can be obtained by hydrogenating a ring-opening (co)polymer with hydrogen in the presence of a hydrogenation catalyst in accordance with a method known per se in the art.

Examples of the hydrogenation catalyst include catalysts composed of a combination of a transition metal compound and an alkyl metal compound, for examples, combinations of cobalt acetate/triethylaluminum, nickel acetylacetonate/triisobutylaluminum, titanocene dichloride/n-butyllithium, zirconocene dichloride/sec-butyllithium, tetrabutoxytitanate/dimethylmagnesium, etc.

The hydrogenation reaction is generally carried out in an inert organic solvent. The organic solvent is preferably a hydrocarbon solvent because it has the excellent ability to dissolve a hydrogenated product formed therein. A cyclic hydrocarbon solvent is more preferred. Examples of such a hydrocarbon solvent include aromatic hydrocarbons such as benzene and toluene; aliphatic hydrocarbons such as n-pentane and hexane; alicyclic hydrocarbons such as cyclohexane and decalin; and ethers such as tetrahydrofuran and ethylene glycol dimethyl ether. At least two of these solvents may also be used in combination. The solvent may be generally the same as that used in the polymerization reaction, and so it is only necessaty to add the hydrogenation catalyst to the polymerization reaction mixture as it is.

The norbornene polymers according to the present invention preferably have high heat resistance and weather resistance. Therefore, it is preferred that generally at least 95%, preferably at least 98%, more preferably at least 99% of the unsaturated bonds in the main chain structures of the ring-opening (co)polymers should be saturated. When non-conjugated unsaturated bonds such as an alkylidine group are present in side chains, they are hydrogenated at the same time as the hydrogenation of the unsaturated bonds in the main chain. The aromatic rings in the side chains may remain unhydrogenated, but may be partially hydrogenated. The unsaturated bonds in the main chain structure and the undaturaed bonds in the aromatic ring structure can be distinguishably identified by $^1$H-NMR analysis.

In order to mainly hydrogenate the unsaturated bonds in the main chain structure, it is desirable that the hydrogenation reaction should be conducted at a temperature of generally $-20°$ C. to $120°$ C., preferably 0 to $100°$ C., more preferably 20 to $80°$ C. under hydrogen pressure of generally 0.1 to 50 kg/cm$^2$, preferably 0.5 to 30 kg/cm$^2$, more preferably 1 to 20 kg/cm$^2$. In order to hydrogenate the aromatic rings, for example, the hydrogenation reaction is conducted at an elevated temperature of about 150 to $250°$ C.

The hydrogenated product of the ring-opening polymer of the norbornene monomer represented by the formula (8) is a polymer containing repeating units represented by the following formula (10), in which the unsaturated bonds in the main chain have been hydrogenated.

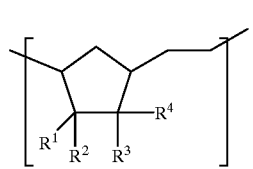

(10)

wherein the respective characters have the same meanings as defined in the formula (1), with the proviso that unsaturated bonds in the side chains may be hydrogenated at the same time as the hydrogenation of the unsaturated bonds in the main chain if any.

The hydrogenated product of the ring-opening polymer of the norbornene monomer represented by the formula (9) is a polymer containing repeating units represented by the following formula (11), in which the unsaturated bonds in the main chain have been hydrogenated.

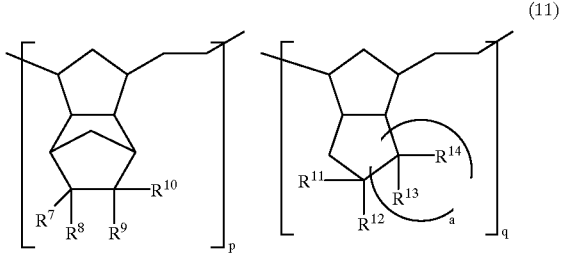

(11)

wherein the respective characters have the same meanings as defined in the formula (3), with the proviso that unsaturated bonds in the side chains may be hydrogenated at the same time as the hydrogenation of the unsaturated bonds in the main chain if any.

Molding Material:

The molding materials according to the present invention are compositions comprising a norbornet polymer and a stabilizer as essential components. As the norbornene polymer, any polymer may be used without any particular limitation so far as it has a weight average molecular weight (Mw) ranging from 10,000 to 1,000,000, preferably from 15,000 to 500,000, more preferably from 20,000 to 100,000, most preferably from 30,000 to 70,000 and a ratio (Mw/Mn) of the weight average molecular weight (Mw) to the number average molecular weight (Mn) ranging from 1.60 to 1.95, preferably from 1.70 to 1.90. Further, a norbornene polymer having a residual metal content of 10 ppm or lower, preferably 5 ppm or lower, more preferably 1 ppm or lower, most preferably 0.1 ppm or lower is preferably used.

In the present invention, the strength properties of the molding material is retained over a long period of time by incorporating the stabilizer therein. Examples of the stabilizer include phenolic antioxidants, phosphoric antioxidants and sulfuric antioxidants. Of these, the phenolic antioxidants are preferred, with alkyl-substituted phenolic antioxidants being particularly preferred.

As the phenolic antioxidants, may be used conventionally known antioxidants, and examples thereof include acrylate compounds described in Japanese Patent Application Laid-Open Nos. 179953/1988 and 168643/1989, such as 2-t-butyl-6-(3-t-butyl-2-hydroxy-5-methylbenzyl)-4-methylphenyl acrylate, 2,4-di-t-amyl-6-(1-(3,5-di-t-amyl-2-hydroxyphenyl)ethyl)phenyl acrylate; alkyl-substituted phenolic compounds such as 2,6-di-t-butyl-4-methylphenol, 2,6-di-t-butyl-4-ethylphenol, octadecyl-3-(3,5-di-t-butyl-4-hydroxyphenyl) propionate, 2,2'-methylene-bis(4-methyl-6-t-butylphenol), 4,4'-butylidene-bis(6-t-butyl-m-cresol, 4,4'-thiobis(3-methyl-6-t-butyl-phenol), bis(3-cyclohexyl-2-hydroxy-5-methylphenyl)-methane, 3,9-bis(2-(3-(3-t-butyl-4-hydroxy-5-methylphenyl)propionyloxy)-1,1-dimethylethyl)-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis(methylene-3(3',5'-di-t-butyl-4'-hydroxyphenyl)propionate)methane [i.e., pentaerythrityl-tetrakis[3-(3,5-di-t-butyl-4-hydroxyphenyl) propionate]], triethylene glycol bis(3-(3-t-butyl-4-hydroxy-5-methylphenyl) propionate) and tocopherol; and triazine group-containing phenolic compounds such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl- 5-t-butyl-anilino)-2,4-bis-octylthio-1,3,5-triazine and 2-octylthio-4,6-bis-(3,5-di-t-butyl-4-oxyanilino)-1,3,5-triazine.

No particular limitation is imposed on the phosphoric antioxidants so far as they are those commonly used in general resin industries, and examples thereof include monophosphite compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, tris(2-t-butyl-4-methylphenyl) phosphite, tris-(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; and diphosphite compounds such as 4,4'-butylidene-bis(3-methyl-6-t-butylphenyl-di-tridecyl phosphite), 4,4'-isopropylidene-bis(phenyl-di-alkyl($C_{12}$–$C_{15}$) phosphite), 4,4'-isopropylidene-bis(diphenylmonoalkyl($C_{12}$–$C_{15}$) phosphite), 1,1,3-tris(2-methyl-4-di-tridecylphosphite-5-t-butylphenyl)butane, tetrakis(2,4-di-t-butylphenyl)-4,4'-biphenylene diphosphite, cyclic neopentanetetrayl bis (octadecyl phsphite), cyclic neopentanetetrayl bis (nonylphenyl phsphite), cyclic neopentanetetrayl bis(2,4-dimethylphenyl phsphite) and cyclic neopentanetetrayl bis (2,4-di-butylphenyl phsphite). Of these, the monophosphite compounds are preferred, with tris(nonylphenyl) phosphate, tris(dinonylphenyl) phosphate and tris(2,4-di-t-butylphenyl) phosphate being particularly preferred.

Examples of the sulfuric antioxides include dilauryl 3,3'-thiodipropionate, dimyristyl 3,3'-thiodipropionate, distearyl 3,3'-thiodipropionate, laurylstearyl 3,3'-thiodipropionate, pentaerythritol tetrakis(β-lauryl thioproionate) and 3,9-bis (2-dodecylthioethyl)-2,4,8,10-tetraoxaspiro[5,5]undecane.

These stabilizers may be used either singly or in any combination thereof. The amount of the stabilizer to be compounded is generally within a range of from 0.001 to 5 parts by weight, preferably from 0.01 to 1 part by weight, per 100 parts by weight of the norbornene polymer.

To the molding materials according to the present invention, may be added rubbery polymers and other thermoplastic resins as needed.

The rubbery polymers are polymers having a glass transition temperature of 0° C. or lower and include general rubber-like polymers and thermoplastic elastomers. The Mooney viscosity ($ML_{1+4}$, 100° C.) of such a rubbery polymer is suitably selected as necessary for the end application intended and is generally 5 to 200.

Examples of the rubber-like polymers include ethylene-α-olefin type rubbery polymers; ethylene-α-olefin-polyene terpolymer rubber; copolymers of ethylene and an unsaturated carboxylic acid ester, such as ethylene-methyl methacrylate; copolymers of ethylene and a fatty acid vinyl ester, such as ethylene-vinyl acetate; polymers of acrylic acid alkyl esters such as ethyl acrylate, butyl acrylate, hexyl acrylate, 2-ethylhexyl acrylate and lauryl acrylate; diene rubbers such as polybutadiene, polyisoprene, styrene-butadiene or stylene-isoprene random copolymers, acrylonitrile-butadiene copolymers, butadiene-isoprene copolymers butadiene-alkyl (meth)acrylate copolymers, butadiene-alkyl (meth)-acrylate-acrylonitrile terpolymers and butadiene-alkyl (meth)acrylate-acrylonitrile-styrene tetrapolymer; and butylene-isoprene copolymers.

Examples of the thermoplastic elastomers include aromatic vinyl-conjugated diene block copolymers such as styrene-butadiene block polymers, hydrogenated styrene-butadiene block copolymers, styrene-isoprene block copolymers and hydrogenated styrene-isoprene block copolymers, low crystalline polybutadiene resins, ethylene-propylene elastomers, styrene-grafted ethylene-propylene elastormers, thermoplastic polyester elastomers, and ethylenic ionomer resins. Of these thermoplastic elastomers, the hydrogenated styrene-butadiene block copolymers and hydrogenated styrene-isoprene block copolymers are preferred. As specific examples thereof, may be mentioned those described in Japanese Patent Application Laid-Open Nos. 133406/1990, 305814/1990, 72512/1991, 74409/1991, etc.

Examples of the other thermoplastic resins include low density polyethylene, high density polyethylene, linear low density polyethylene, very low density polyethylene, ethylene-ethyl acrylate copolymers, ethylene-vinyl acetate copolymers, polystyrene, poly(phenylene sulfide), poly (phenylene ether), polyamide, polyester, polycarbonate and cellulose acetate.

These rubbery polymers and other thermoplastic resins may be used either singly or in any combination thereof. The compounding amount thereof is suitably selected as necessary for the end application intended. However, it is of the order of generally 0.1 to 100 parts by weight, preferably 1 to 30 parts by weight, per 100 parts by weight of the norbornene polymer.

In the present invention, at least one of various compounding additives generally used in resin industries may be compounded. Examples of the compounding additives include ultraviolet absorbents, pitments, dyes, lubricants, leveling agents, antiblocking agents, nucleating agents, hydrochloric acid absorbents, lubricants such as natural oil, synthetic oil and wax, flame redardants, antistatic agents, fillers, fatty acid metal salts such as zinc stearate, calcium stearate and calcium 1,2-hydroxystearate, and polyhydric alcohol fatty acid esters such as glycerol monostearate, glycerol distearate, pentaerythritol distearate and pentaerythritol tristearate. These compounding additives may be used either singly or in any combination thereof. The compounding amount thereof is suitably selected as necessary for the end application intended.

Some specific examples of the compounding additives are mentioned below.

Examples of the ultraviolet absorbents include hindered amine type ultravaiolet absorbents such as 2,2,6,6-tetramethyl-4-piperidyl benzoate, bis(2,2,6,6-tetramethyl-4-piperidyl) sebacate, bis(1,2,2,6,6-pentamethyl-4-piperidyl) 2-(3,5-di-t-butyl-4-hyroxybenzyl)-2-n-butylmalonate and 4-(3-(3,5-di-t-butyl-4-hydroxyphenyl)-propionyloxy)-1-(2-(3-(3,5-di-t-butyl-4-hydroxyphenyl)-propionyloxy)ethyl)-2,2,6,6-tetramethylpiperidine; benzotriazole type ultraviolet absorbents such as 2(2-hydroxy-5-methylphenyl) benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole and 2-(3,5-di-t-amyl-2-hydroxyphenyl) benzotriazole; and benzoate type ultraviolet absorbents such as 2,4-di-t-butylphenyl 3,5-di-t-butyl-4-hydroxybenzoate and hexadecyl 3,5-di-t-butyl-4-hydroxybenzoate.

These ultraviolet absorbents may be used either singly or in any combination thereof. The compounding amount of the ultraviolet absorbent is generally within a range of from 0.001 to 5 parts by weight, preferably from 0.01 to 1 part by weight, per 100 parts by weight of the norbornene polymer.

As the leveling agents for improving surface roughness of formed products such as films, may be used, for examples, leveling agent for paints, such as fluorine-containing non-ionic surfactants, special acrylic resin type leveling agents and silicone type leveling agents. Of these, those having good compatibility with solvents are preferred. The amount of the leveling agent to be added is generally 5 to 50,000 ppm, preferably 10 to 20,000 ppm.

Preferable examples of the nucleating agents include salts of benzoic acid, dibenzylidenesorbitol and derivatives thereof, salts of phosphoric acid esters, and polymers having a high boiling point, such as polyvinylcyclohexane, poly(3-methylbutene), crystalline polystyrene and derivatives thereof, and trimethylvinylsilane. Besides, inorganic compounds such as talc, kaolin and mica may also be preferably used. These nucleating agents may be used either singly or in any combination thereof. The amount of the nucleating agent to be used is generally within a range of from 0.0001 to 1 wt. %.

Examples of the hydrochloric acid absorbents include fatty acid metal salts such as sodium stearate, magnesium stearate, calcium stearate, zinc stearate, lithium stearate, sodium 12-hydroxystearate, calcium 12-hydroxy-stearate, magnesium 12-hydroxystearate and zinc 12-hydroxystearate; epoxy compounds such as epoxidized octyl stearate and epoxidized soybean oil; and ionorganic compounds such as magnesium hydroxide, calcium hydroxide and hydrotalcite. These hydrochloric acid absorbents may be used either singly or in any combination thereof. The compounding amount of the hydrochloric acid absorbent is generally within a range of from 0.001 to 5 parts by weight, preferably from 0.01 to 1 part by weight, per 100 parts by weight of the norbornene polymer.

As examples of the antistatic agents, may be mentioned sodium alkylsulfonates and/or alkylsulfonic acid phosphonium salts, and hydroxyamine compounds of fatty acid esters such as stearic acid glycerol esters. These antistatic agents may be used either singly or in any combination thereof. The compounding amount of the antistatic agent is generally within a range of from 0 to 5 parts by weight per 100 parts by weight of the norbornene polymer.

As examples of the fillers, may be mentioned silica, diatomaceous earth, alumina, titanium oxide, magnesium oxide, pumice powder, pumice balloon, basic magnesium carbonate, dolomite, calcium sulfate, potassium titanate, barium sulfate, calcium sulfite, talc, clay, mica, asbestos, glass fibers, glass flake, glass beads, calcium silicate, montmorillonite, bentonite, graphite, aluminum powder, molybdenum sulfide, boron fibers, silicon carbide fibers, polyethylene fibers, polypropylene fibers, polyester fibers and polyamide fibers.

Examples of inorganic fillers include calcium oxide, magnesium oxide, aluminum hydroxide, calcium hydroxide, magnesium hydroxide, magnesium carbonate, calcium silicate, magnesium silicate, calcium carbonate, calcium titanate, barium sulfate, magnesium sulfate, calcium sulfite, talc, clay, glass, mica, dolomite, basic calcium carbonate, zinc oxide, silica, carbon black and glass fibers. Of these, calcium carbonate, barium sulfate, mica and talc are particularly preferred. The inorganic fillers are preferably subjected to a surface treatment before use. The surface treatment may be conducted in accordance with any conventionally-known method. Specific examples of the inorganic filler subjected to the surface treatment include those treated with a silane or titanium type coupling agent, or an acid such as a higher fatty acid or unsaturated organic acid. No particular limitation is imposed on the particle sizes of the inorganic fillers. However, those having an average particle size of 5 $\mu$m or smaller are generally used.

These inorganic filler may be used either singly or in any combination thereof. The amount of the inorganic filler to be used is generally within a range of from 0.1 to 50 parts by weight, preferably from 1 to 40 parts by weight, more preferably from 5 to 30 parts by weight, per 100 parts by weight of the norbornene polymer.

The molding materials according to the present invention can be obtained by mixing the above-described components in accordance with a method known per se in the art. For example, the components are mixed by means of a Henschel mixer or the like and then kneaded by means of an extruder such as a single-screw extruder or twin-screw extruder, or a Banbury, Brabender, Plastomill, kneader, roll, extruder, multi-screw kneader or double-helical ribon mixer. A resin composition obtained after the kneading is generally hundled in the form of pellets. However, when a sheet or film is formed by a solvent casting process, the norbornene polymer, desired compounding additives and the like are dissolved or dispersed in a proper solvent before use.

EXAMPLES

The present invention will hereinafter be described more specifically by reference to the following Examples and Comparative Examples. Various physical properties or the like of polymers were measured or determined in accordance with the following methods:

(1) Glass Transition Temperature:

The glass transition temperature was measured in accordance with the differential scanning calorimetry (DSC).

(2) Molecular Weight:

The molecular weight was determined in terms of polyisoprene as measured by gel permeation chromatography (GPC) using cyclohexane as a solvent unless expressly noted.

(3) Conversion Into Polymer:

The conversion into a polymer was calculated out from the amount of residual monomer(s) determined by gas chromatography.

(4) Rate of Hydrogenation:

The rate of hydrogenation of a main chain was determined by $^1$H-NMR.

(5) Critical Stress:

The critical stress was measured in accordance with the Berugen's quarter elliptic method after immersing a specimen for 1 hour in a fatty acid triglyceride (linolic acid: 50%; oleic acid: 25%; palmitic acid: 10%, linolenic acid: 10%; and stearic acid: 5%) as a reagent.

(6) Flexural Strength and Flexural Modulus:

The flexural strength and flexural modulus were determined in accordance with JIS K 7203 by using a specimen (4 mm high, 10 mm wide and 100 mm long) prepared by hot press molding at 200° C. by means of a hot press molding machine (manufactured by Tester Sangyo K.K.).

(7) Melt Flow Rate:

The melt flow rate (MFR) was measured under conditions of 280° C. and a load of 1.6 kgf /mm$^2$ in accordance with JIS K 7210.

(8) Residual Metal Content:

A 50-ml Kjeldahl flask was charged with 50 g of a polymer sample and heated by a burner while introducing a nitrogen gas, thereby carbonize the sample. To the carbonized sample were added 3 ml of concentrated sulfuric acid, whereby the sample was turned tarry. To this tarry substance, 0.1 to 1 ml of 16N HNO$_3$ was added dropwise, and the flask was heated again by the burner to obtain a transparent liquid metal salt. Purified water was added to this salt to 5 ml. An inductively coupled plasma emission spectrometer, SPS1200, AR (manufactured by Seiko Instruments Inc.) was caused to suck the thus-prepared specimen to determine residual quantities as to individual metals.

Example 1

A 2-liter flask purged with nitrogen was charged with 10 g of methyldimethanooctahydronaphthalene (hereinafter referred to as "MTD") and 240 g of cyclohexane, followed by addition of 0.574 mmol of triethylaluminum and 0.574 mmol of isobutyl alcohol as a polymerization catalyst system, and 4.0 mmol of 1-hexene as a molecular weight modifier. To the mixture, 0.104 mmol of tungsten hexachloride was added, and stirring was conducted at 40° C. for 5 minutes. Thereafter, 90 g of MTD and 0.172 mmol of tungsten hexachloride were continuously added dropwise to the system over about 30 minutes. After completion of the addition, stirring was continued for additional 30 minutes to complete polymerization. The result of the polymerization is shown in Table 1.

This polymerization reaction mixture was transferred to a 1-liter autoclave, and 320 g of cyclohexane were added thereto. After 5.0 g of a nickel catalyst on alumina (containg 1.40 parts by weight of nickel and 0.4 parts by weight of nickel oxide in 1 part by weight of the catalyst; pore volume: 0.8 cm$^3$/g; specific surface area: 300 cm$^2$/g) as a hydrogenation catalyst and 5.0 g of activated alumina (specific surface area: 320 cm$^2$/g; pore volume: 0.8 cm$^3$/g; average particle size: 15 μm; Neobead D powder produced by Mizusawa Industrial Chemicals, Inc.) were added to the autoclave, and the interior of the autoclave was purged with nitrogen, the pressure within the autoclave was raised to about 20 kg/cm$^2$G, and the contents were heated to 230° C. with stirring. The hydrogen pressure was raised to 50 kg/cm$^2$G at the time the temperature was stabilized, thereby conducting a reaction for 5 hours while supplying hydrogen consumed in the course of the reaction.

After the hydrogenation catalyst and activated alumina were separated by filtration, the hydrogenation reaction mixture was poured into 3 liters of isopropyl alcohol to deposit a resin formed. The resin was collected by filtration and then dried for 48 hours at 100° C. under 1 Torr or lower. Tetrakis(methylene-3(3',5'-di-t-butyl-4'-hydroxyphenyl) propionate)methane was added in a proportion of 0.1 parts by weight per 100 parts by weight of the thus-obtained hydrogenated product. The resultant mixture was kneaded at 200° C. by means of a twin-screw extruder to prepare pellets. The various physical properties of the hydrogenated product are shown in Tables 1 and 2.

This hydrogenated product is a polymer having peating units represented by a formula (12):

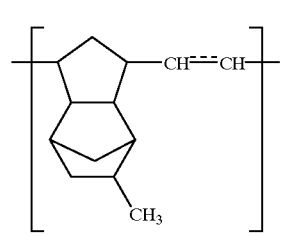

(12)

wherein almost 100% of ... come to carbon-carbon single sonds due to the hydrogenation.

Example 2

A hydrogenation product and pellets were obtained in the same manner as in Example 1 except that triisobutylaluminum and ethyl alcohol were used in place of triethylaluminum and isobutyl alcohol, respectively. The various physical properties of the resultant polymer and hydrogenated product are shown in Tables 1 and 2.

Example 3

A hydrogenation product and pellets were obtained in the same manner as in Example 1 except that triisobutylaluminum was used in place of triethylaluminum. The various physical properties of the resultant polymer and hydrogenated product are shown in Tables 1 and 2.

Example 4

A hydrogenation product and pellets were obtained in the same manner as in Example 2 except that phenol was used in place of ethyl alcohol. The various physical properties of the resultant polymer and hydrogenated product are shown in Tables 1 and 2.

Example 5

A hydrogenation product and pellets were obtained in the same manner as in Example 3 except that molybdenum pentachloride was used in place of tungsten hexachloride. The various physical properties of the resultant polymer and hydrogenated product are shown in Tables 1 and 2.

Example 6

A hydrogenation product and pellets were obtained in the same manner as in Example 3 except that methanotetrahydrofluorene (hereinafter referred to as "MTF") was used in place of MTD. The various physical properties of the resultant polymer and hydrogenated product are shown in Tables 1 and 2. However, the molecular weight after the polymerization was expressed by a value in terms of polystyrene as measured by GPC using toluene as a solvent.

This hydrogenated product is a polymer having repeating units represented by a formula (13):

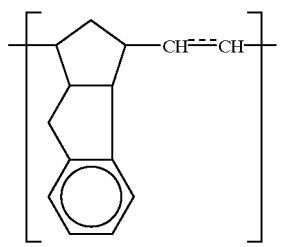

(13)

wherein almost 100% of ... come to carbon-carbon single bonds due to the hydrogenation.

Example 7

A hydrogenation product and pellets were obtained in the same manner as in Example 3 except that 5-phenyl-2-norbornene was used in place of MTD. The various physical properties of the resultant polymer and hydrogenated product are shown in Tables 1 and 2. However, the molecular weight after the polymerization was expressed by a value in terms of polystyrene as measured by GPC using toluene as a solvent.

This hydrogenated product is a polymer having repeating units represented by a formula (14):

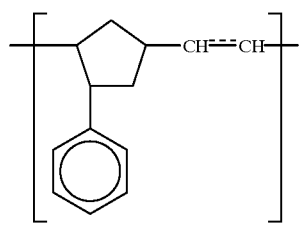

(14)

wherein almost 100% of ... come to carbon-carbon single bonds due to the hydrogenation.

Example 8

A hydrogenation product and pellets were obtained in the same manner as in Example 3 except that 5-methyl-5-methoxycarbonyl-2-norbornene was used in place of MTD. The various physical properties of the resultant polymer and hydrogenated product are shown in Tables 1 and 2. However, the molecular weight after the polymerization was expressed by a value in terms of polystyrene as measured by GPC using toluene as a solvent.

This hydrogenated product is a polymer having repeating units represented by a formula (15):

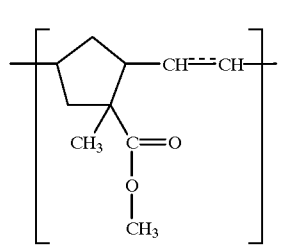

(15)

wherein almost 100% of ... come to carbon-carbon single bonds due to the hydrogenation.

Example 9

A hydrogenation product and pellets were obtained in the same manner as in Example 2 except that trihexylaluminum was used in place of triisobutylaluminum. The various physical properties of the resultant polymer and hydrogenated product are shown in Tables 1 and 2.

Example 10

A hydrogenation product and pellets were obtained in the same manner as in Example 3 except that dicyclopentadiene (hereinafter referred to as "DCP") was used in place of MTD, 0.287 mmol of diisopropyl ether was added, and the reaction temperature of the hydrogenation was changed to 150° C. The various physical properties of the resultant polymer and hydrogenated product are shown in Tables 1 and 2.

This hydrogenated product is a polymer having repeating units represented by a formula (16):

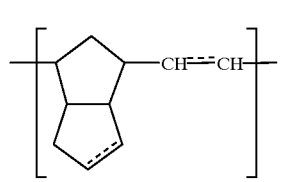

(16)

wherein almost 100% of ... come to carbon-carbon single bonds due to the hydrogenation.

Example 11

A hydrogenation product and pellets were obtained in the same manner as in Example 1 except that DCP was used in place of MTD, 0.144 mmol of dioxane was added as a fourth component of the catalyst system, and the reaction temperature of the hydrogenation was changed to 150° C. The various physical properties of the resultant polymer and hydrogenated product are shown in Tables 1 and 2.

Example 12

A hydrogenation product and pellets were obtained in the same manner as in Example 1 except that DCP and triisobutylaluminum were used in place of MTD and triethylaluminum, respectively, 0.287 mmol of isopropyl ether was added as a fourth component of the catalyst system, and the reaction temperature of the hydrogenation was changed to 150° C. The various physical properties of the resultant polymer and hydrogenated product are shown in Tables 1 and 2.

Example 13

A hydrogenation product and pellets were obtained in the same manner as in Example 12 except that methano-octahydrofluorene was used in place of DCP. The various physical properties of the resultant polymer and hydrogenated product are shown in Tables 1 and 2.

This hydrogenated product is a polymer having repeating units represented by a formula (17):

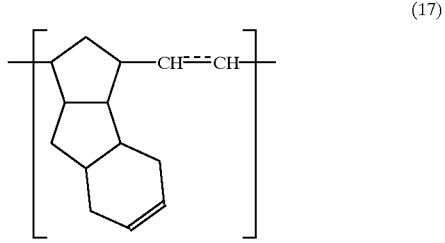

(17)

wherein almost 100% of ... come to carbon-carbon single bonds due to the hydrogenation.

Example 14

A hydrogenation product and pellets were obtained in the same manner as in Example 12 except that MTD was used in place of DCP. The various physical properties of the resultant polymer and hydrogenated product are shown in Tables 1 and 2.

Example 15

A hydrogenation product and pellets were obtained in the same manner as in Example 12 except that MTF was used in place of DCP. The various physical properties of the resultant polymer and hydrogenated product are shown in Tables 1 and 2. However, the molecular weight after the polymerization was expressed by a value in terms of polystyrene as measured by GPC using toluene as a solvent.

Comparative Example 1

A 1-liter flask purged with nitrogen was charged with 10 g of methyldimethanooctahydronaphthalene and 120 g of cyclohexane, followed by addition of 7.23 mmol of triethylaluminum and 19.94 mmol of triethylamine as a polymerization catalyst system, and 1.15 mmol of 1-hexene as a molecular weight modifier. The resultant mixture was heated to 35° C. To the mixture, 4.88 mmol of titanium tetrachloride and 40 g of methyldimethanooctahydronaphthalene were continuously added dropwise over about 30 minutes while keeping the reaction system at 35° C. After completion of the addition, stirring was continued for additional 30 minutes to complete polymerization. The result of the polymerization is shown in Table 1.

This polymerization reaction mixture was subjected to hydrogenation in the same manner as in Example 1. However, the resultant reaction producth was scarcely hydrogenated. The result is shown in Table 1.

Comparative Example 2

A 1-liter flask purged with nitrogen was charged with 50 g of methyldimethanooctahydronaphthalene and 120 g of cyclohexane, followed by addition of 23.7 mmol of 1-hexene as a molecular weight modifier. To this solution, 0.33 mmol of molybdenum pentachloride, 1.28 mmol of diethylaluminum iodide and 19.9 mmol of ethyl acetate were added as a polymerization catalyst system. The resultant mixture was stirred at 27 to 29° C. for 30 minutes to conduct polymerization. The result of the polymerization is shown in Table 1.

This polymerization reaction mixture was subjected to hydrogenation in the same manner as in Example 1 to prepare pellets. The various physical properties of the resultant polymer and hydrogenated product are shown in Tables 1 and 2.

Comparative Example 3

A hydrogenation product and pellets were obtained in the same manner as in Comparative Example 2 except that MTF was used in place of MTD. The various physical properties of the resultant polymer and hydrogenated product are shown in Tables 1 and 2. However, the molecular weight after the polymerization was expressed by a value in terms of polystyrene as measured by GPC using toluene as a solvent.

Comparative Example 4

A hydrogenation product and pellets were obtained in the same manner as in Comparative Example 2 except that DCP was used in place of MTD. The various physical properties of the resultant polymer and hydrogenated product are shown in Tables 1 and 2.

Comparative Example 5

A hydrogenation product and pellets were obtained in the same manner as in Example 10 except that diethyl ether and tetrabutyltin were used in place of disopropyl ether and isobutyl alcohol, and triethyaluminum, respectively, and the reaction temperature was changed to 70° C. The various physical properties of the resultant polymer and hydrogenated product are shown in Tables 1 and 2.

Comparative Example 6

Polymerization was conducted in the same manner as in Example 1 except that ethyl alcohol was used in place of isobutyl alcohol. Since gelation took place in the first half of the dropwise addition of the catalyst and monomer, however, the reaction was stopped.

Comparative Example 7

Polymerization was conducted in the same manner as in Example 2 except that a diethyl ether complex of triethylaluminum was used in place of triisobutylaluminum. Since gelation took place in the first half of the dropwise addition of the catalyst and monomer, however, the reaction was stopped.

Comparative Example 8

Polymerization was conducted in the same manner as in Example 2 except that diisopropyl ether was used in place of ethyl alcohol. Since gelation took place in the first half of the dropwise addition of the catalyst and monomer, however, the reaction was stopped.

Comparative Example 9

Polymerization was conducted in the same manner as in Example 2 except that methyl alcohol was used in place of ethyl alcohol. Since gelation took place in the first half of the dropwise addition of the catalyst and monomer, however, the reaction was stopped.

TABLE 1

| | Molecular weight after polymerization (x 10⁴) | | | | Molecular weight after hydrogenation (x 10⁴) | | | |
|---|---|---|---|---|---|---|---|---|
| | Mn | Mw | Mn/Mn | Conversion | Mn | Mw | Mn/Mn | Rate of hydrogenation |
| Ex. 1 | 1.85 | 3.53 | 1.91 | 100 | 2.78 | 5.23 | 1.88 | ≧99.9 |
| Ex. 2 | 1.79 | 3.36 | 1.88 | 100 | 2.66 | 4.98 | 1.87 | ≧99.9 |
| Ex. 3 | 1.73 | 3.21 | 1.85 | 100 | 2.68 | 4.88 | 1.82 | ≧99.9 |
| Ex. 4 | 1.75 | 3.58 | 1.86 | 100 | 2.78 | 5.19 | 1.87 | ≧99.9 |
| Ex. 5 | 1.62 | 3.13 | 1.93 | 100 | 2.81 | 5.34 | 1.90 | ≧99.9 |
| Ex. 6 | 2.61 | 4.72 | 1.81 (*1) | 100 | 3.02 | 5.43 | 1.80 | ≧99.9 |
| Ex. 7 | 2.39 | 4.45 | 1.86 (*1) | 100 | 2.70 | 5.02 | 1.88 | ≧99.9 |
| Ex. 8 | 2.41 | 4.68 | 1.94 (*1) | 100 | 2.94 | 5.59 | 1.90 (*1) | ≧99.9 |
| Ex. 9 | 1.77 | 3.43 | 1.94 | 100 | 2.81 | 5.42 | 1.93 | ≧99.9 |
| Ex. 10 | 1.54 | 2.99 | 1.94 | 100 | 2.24 | 4.31 | 1.92 | ≧99.9 |
| Ex. 11 | 1.59 | 3.08 | 1.94 | 100 | 2.29 | 4.42 | 1.93 | ≧99.9 |
| Ex. 12 | 1.60 | 3.01 | 1.88 | 100 | 2.32 | 4.27 | 1.84 | ≧99.9 |
| Ex. 13 | 1.84 | 3.48 | 1.89 | 100 | 2.81 | 5.17 | 1.84 | ≧99.9 |
| Ex. 14 | 1.92 | 3.55 | 1.85 | 100 | 2.88 | 5.18 | 1.80 | ≧99.9 |
| Ex. 15 | 2.69 | 4.82 | 1.79 (*1) | 100 | 3.11 | 5.54 | 1.78 | ≧99.9 |
| Comp. Ex. 1 | 1.68 | 3.38 | 2.01 | 87 | | Not hydrogenated | | |
| Comp. Ex. 2 | 1.26 | 4.83 | 3.83 | 100 | 2.02 | 7.15 | 3.54 | ≧99.9 |
| Comp. Ex. 3 | 1.43 | 5.38 | 3.77 (*1) | 100 | 2.43 | 7.81 | 3.21 | ≧99.9 |
| Comp. Ex. 4 | 1.06 | 4.26 | 4.03 | 100 | 1.54 | 5.96 | 3.87 | ≧99.9 |
| Comp. Ex. 5 | 1.28 | 2.85 | 2.22 | 100 | 2.50 | 5.41 | 2.16 | ≧99.9 |
| Comp. Ex. 6 | Reaction was stopped due to gelation. | | | | Hydrogenation was not conducted. | | | |
| Comp. Ex. 7 | | | | | | | | |
| Comp. Ex. 8 | | | | | | | | |
| Comp. Ex. 9 | | | | | | | | |

(*1) A value in terms of polystyrene as measured using toluene as a solvent.

TABLE 2

| | Critical sress (kg/cm²) | Flexural strength (kg/cm²) | Flexural modulus (kg/cm²) | MFR (g/10 min) | Residual metal content (ppm) (*1) | | | |
|---|---|---|---|---|---|---|---|---|
| | | | | | W | Al | Sn | Ni |
| Ex. 1 | 188 | 1150 | 27000 | 16 | N.D | N.D | — | N.D |
| Ex. 2 | 191 | 1200 | 27000 | 19 | N.D | N.D | — | N.D |
| Ex. 3 | 182 | 1100 | 26500 | 19 | N.D | N.D | — | N.D |
| Ex. 4 | 188 | 1100 | 26700 | 17 | N.D | N.D | — | N.D |
| Ex. 5 | 188 | 1150 | 27000 | 17 | N.D | N.D | — | N.D |
| Ex. 6 | 173 | 1200 | 30000 | 18 | N.D | N.D | — | N.D |
| Ex. 7 | 150 | 750 | 24000 | 21 | N.D | N.D | — | N.D |
| Ex. 8 | 182 | 650 | 18000 | 20 | N.D | N.D | — | N.D |
| Ex. 9 | 182 | 1100 | 27000 | 16 | N.D | N.D | — | N.D |
| Ex. 10 | 140 | 750 | 20000 | 25 | N.D | N.D | — | N.D |
| Ex. 11 | 145 | 750 | 20000 | 21 | N.D | N.D | — | N.D |
| Ex. 12 | 145 | 780 | 21000 | 23 | N.D | N.D | — | N.D |
| Ex. 13 | 191 | 1200 | 27000 | 17 | N.D | N.D | — | N.D |
| Ex. 14 | 202 | 1200 | 27500 | 17 | N.D | N.D | — | N.D |
| Ex. 15 | 178 | 1250 | 30000 | 18 | N.D | N.D | — | N.D |
| Comp. Ex. 2 | 125 | 850 | 22000 | 7 | N.D | N.D | — | N.D |
| Comp. Ex. 3 | 140 | 900 | 29000 | 10 | N.D | N.D | — | N.D |
| Comp. Ex. 4 | 95 | 600 | 18000 | 17 | N.D | N.D | — | N.D |
| Comp. Ex. 5 | 188 | 1100 | 27000 | 14 | N.D | N.D | 37 | N.D |

(*1) N.D: Not detected (limit of detection = 10 ppb).

INDUSTRIAL APPLICABILITY

According to the present invention, there are provided norbornene polymers excellent in strength properties and processability, low in residual metal content, and hard to undergo discoloration, and production processes thereof. The norbornene polymers according to the present invention can be applied to various uses such as, for example, optical materials, medical materials and semiconductor materials. The norbornene polymers according to the present invention are particularly suitable for use in, for example, medical bottles, syringes, vials, housings, casings, insulating materials, etc..

What is claimed is:

1. A norbornene polymer which is a ring-opening (co) polymer of a norbornene monomer, or a hydrogenated product thereof, wherein said norbornene polymer has a weight average molecular weight (Mw) ranging from 30,000 to 70,000, a ratio (Mw/Mn) of the weight average molecular weight (Mw) to number average molecular weight (Mn) ranging from 1.60 to 1.90, and a residual metal content of 10 ppm or lower.

2. The norbornene polymer according to claim 1, wherein the residual metal content is 0.1 ppm or lower.

3. The norbornene polymer according to claim 1, which contains repeating units represented by a formula (1):

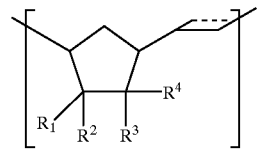

(1)

wherein $R^1$ to $R^4$ are independently a hydrogen atom, hydrocarbon group, halogen atom, hydroxyl group, ester group, alkoxy group, cyano group, amide group, imide group or silyl group, or a hydrocarbon group substituted by a polar group selected from the group consisting of a halogen, atom, hydroxyl group, ester group, alkoxy group, cyano group, amide group, imide group and silyl group, with the proviso that at least two of $R^1$ to $R^4$ may be bonded to each other to form an unsaturated bond, monocycle or polycycle, the monocycle or polycycle may have double bond(s) or be in the form of an aromatic ring, and $R^1$ and $R^2$, or $R^3$ and $R^4$ may form an alkylidene group, and . . . means either a carbon-carbon single bond or a carbon-carbon double bond.

4. The norbornene polymer according to claim 1, which contains repeating units represented by a formula (3):

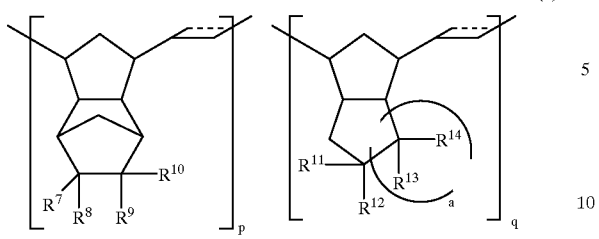

(3)

wherein $R^7$ to $R^{10}$ are independently a hydrogen atom, hydrocarbon group, halogen atom, hydroxyl group, ester group, alkoxy group, cyano group, amide group, imide group or silyl group, or a hydrocarbon group substituted by a polar group selected from the group consisting of a halogen, atom, hydroxyl group, ester group, alkoxy group, cyano group, amide group, imide group and silyl group, with the proviso that at least two of $R^7$ to $R^{10}$ may be bonded to each other to form an unsaturated bond, monocycle or polycycle, the monocycle or polycycle may have double bond(s) or be in the form of an aromatic ring, and $R^7$ and $R^8$, or $R^9$ and $R^{10}$ may form an alkylidene group, $R^{11}$ to $R^{14}$ are independently a hydrogen atom, hydrocarbon group, halogen atom, hydroxyl group, ester group, alkoxy group, cyano group, amide group, imide group or silyl group, or a hydrocarbon group substituted by a polar group selected from the group consisting of a halogen, atom, hydroxyl group, ester group, alkoxy group, cyano group, amide group, imide group and silyl group, with the proviso that at least two of $R^{11}$ to $R^{14}$ may be bonded to each other to form an unsaturated bond, monocycle or polycycle, the monocycle or polycycle may have double bond(s) or be in the form of an aromatic ring, and $R^{11}$ and $R^{12}$, or $R^{13}$ and $R^{14}$ may form an alkylidene group, a is 1 or 2, p and q satisfy the relationship of p+q=1, p=0 to 1, and q=0 to 1, and . . . means either a carbon-carbon single bond or a carbon-carbon double bond.

5. The norbornene polymer according to claim 1, wherein the norbornene monomer is at least one selected from the group consisting of methyldimethanooctahydronaphthalene, methanotetrahydrofluorene, 5-phenyl-2-norbornene, 5-methyl-5-methoxycarbonyl-2-norbornene, dicyclopentadiene and methanooctahydronaphthalene.

6. A process for producing a norbornene polymer by polymerizing a norbornene monomer in the presence of a metathesis catalyst system comprising:
   (1) at least one transition metal compound selected from the group consisting of W compounds, Mo compounds and Re compounds;
   (2) an organoaluminum compound; and
   (3) an alcohol having at least 2 carbon atoms, wherein the sum total of the number of carbon atoms in the organic residue of the organoaluminum compound and the number of carbon atoms in the alcohol is at least 9, the process comprising the following steps (i) to (iii):
      (i) mixing the organoaluminum compound with the alcohol, and then mixing at least a part of the norbornene monomer therewith,
      (ii) adding at least a part of the transition metal compound to initiate polymerization, and
      (iii) adding a mixture of any remaining norbornene monomer and transition metal compound to continue the polymerization.

7. The production process according to claim 6, wherein the sum total of the number of carbon atoms in the organic residue of the organoaluminum compound and the number of carbon atoms in the alcohol is within a range of from 12 to 20.

8. A process for producing a norbornene polymer by polymerizing a norbornene monomer in the presence of a metathesis catalyst system comprising:
   (1) at least one transition metal compound selected from the group consisting of W compounds, Mo compounds and Re compounds;
   (2) an organoaluminum compound; and
   (3) an alcohol having at least 2 carbon atoms, wherein the sum total of the number of carbon atoms in the organic residue of the organoaluminum compound and the number of carbon atoms in the alcohol is at least 9, the process comprising the following steps (i) and (ii):
      (i) mixing the organoaluminum compound, the alcohol, a part of the norbornene monomer and a part of the transition metal compound with one another in the recited order, and
      (ii) adding the remaining norbornene monomer and transition metal compound to conduct polymerization.

9. The production process according to claim 8, wherein the sum total of the number of carbon atoms in the organic residue of the organoaluminum compound and the number of carbon atoms in the alcohol is within a range of from 12 to 20.

10. A process for producing a norbornene polymer by polymerizing a norbornene monomer in the presence of a metathesis catalyst system comprising:
    (1) at least one transition metal compound selected from the group consisting of W compounds, Mo compounds and Re compounds;
    (2) an organoaluminum compound;
    (3) an alcohol; and
    (4) an oxygen-containing organic compound other than the alcohol, the process comprising the following steps (i) to (iii):
       (i) mixing the organoaluminum compound with the alcohol and the oxygen-containing organic compound other than the alcohol, and then mixing at least a part of the norbornene monomer therewith,
       (ii) adding at least a part of the transition metal compound to initiate polymerization, and
       (iii) adding a mixture of any remaining norbornene monomer and transition metal compound to continue the polymerization.

11. The production process according to claim 10, wherein the oxygen-containing organic compound other than alcohol is at least one compound selected from the group consisting of ethers, ketones, esters and carboxylic acids.

12. A process for producing a norbornene polymer by polymerizing a norbornene monomer in the presence of a metathesis catalyst system comprising:
    (1) at least one transition metal compound selected from the group consisting of W compounds, Mo compounds and Re compounds;
    (2) an organoaluminum compound;
    (3) an alcohol; and
    (4) an oxygen-containing organic compound other than the alcohol, the process comprising the following steps (i) and (ii):
       (i) mixing the organoaluminum compound, the alcohol, the oxygen-containing organic compound other than the alcohol, a part of the norbornene monomer and a part of the transition metal compound with one another in the recited order, and (ii) adding the remaining norbornene monomer and transition metal compound to conduct polymerization.

13. The production process according to claim 12, wherein the oxygen-containing organic compound other than alcohol is at least one compound selected from the group consisting of ethers, ketones, esters and carboxylic acids.

14. A molding material comprising (A) norbornene polymer which is a ring-opening (co)polymer of a norbornene monomer, or a hydrogenated product thereof, wherein said norbornene polymer has a weight average molecular weight (Mw) ranging from 30,000 to 70,000, a ratio (Mw/Mn) of the weight average molecular weight (Mw) to number average molecular weight (Mn) ranging from 1.60 to 1.90, and a residual metal content of 10 ppm or lower, and (B) a stabilizer.

* * * * *

UNITED STATES PATENT AND TRADEMARK OFFICE
CERTIFICATE OF CORRECTION

PATENT NO.     : 6,310,160 B1
DATED          : October 30, 2001
INVENTOR(S)    : Junji Kodemura It is certified that error appears in the above-identified patent and that said Letters Patent is hereby corrected as shown below:

<u>Column 29, claim 4,</u>
Line 29, change "halogen, atom" to -- halogen atom --.

Signed and Sealed this

Twenty-sixth Day of March, 2002

Attest:

JAMES E. ROGAN
*Attesting Officer*     *Director of the United States Patent and Trademark Office*